United States Patent Office 3,741,861
Patented June 26, 1973

3,741,861
METHOD FOR IMPROVING THE CHEMICAL
DURABILITY OF OPAL GLASSES
André Andrieu, 3 Avenue de Stalingrad,
Nemours, France
Filed Apr. 5, 1971, Ser. No. 130,905
Claims priority, application France, Mar. 27, 1970,
7011285
Int. Cl. C03c 23/00
U.S. Cl. 161—166                           8 Claims

ABSTRACT OF THE DISCLOSURE

The present invention relates to a process for improving the chemical durability of glass articles and, particularly, to a thermal treatment which modifies a thin surface layer on glass articles that are opal because of phase separation therein in such a manner that the phenomenon of phase separation is suppressed or controlled within this thin surface layer; whereas, at the same time, the interior glass is allowed to attain or retain the degree of phase separation which is necessary to obtain the desired opalescence. This process is of special interest for products formed from glasses with immiscible vitreous phases which are likely to be exposed, during use, to the action of relatively reactive chemical solutions such as water, acids, alkaline wash waters, or phosphate wash waters.

---

Figure 1:
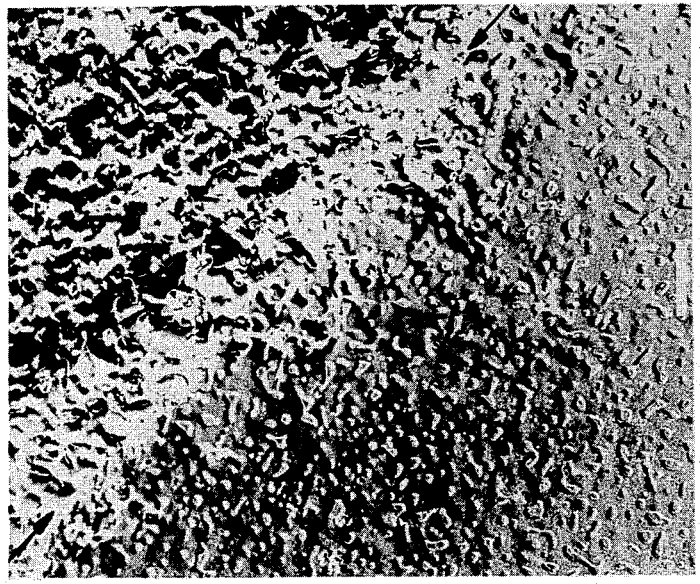

It is known that certain opal glasses, notably low expansion borosilicates intended for the fabrication of flame ware, i.e., articles which can be used as cooking vessels in contact with heating elements of a stove, owe their opalescence to a phenomenon of phase separation. The glass, which is homogeneous in the fused state, separates into several vitreous phases during the cooling accompanying the forming step. This phase separation can be promoted by an appropriate thermal treatment, if the spontaneous phase separation gives micelles of small dimensions only which must be made to grow in order to diffuse visible light. Glasses of this type contain a considerable quantity of boric anhydride in one of the separated phases which is readily soluble in those above-mentioned substances which come into contact with tableware and cooking ware.

In the usual forming process, e.g., blowing, pressing, rolling, or drawing, phase separation develops even within the surface of the glass article. Thus, micelles of the soluble phase are found very close to the article surface. Therefore, as soon as the thin skin of the resistant phase which constitutes the surface of the article has been breached, chemical agents permeate into the glass. Micelles of the soluble phase are then dissolved therein and this attack creates voids which are capable of absorbing the coloring material occurring naturally in foodstuffs. This results in a surface that is stained, is not shiny or aesthetically pleasing, and is difficult to clean.

There exist a number of methods suitable for improving the chemical durability of the surface of glasses among which, perhaps, the best known are:

(a) A process involving the dealkalization of the surface of an article in such a way that a certain thickness of glass surface is made less reactive. This operation can be carried out by reaction with an acid product such as $SO_2$, $SO_3$, or kaolin.

(b) One can also dealkalize the glass surface by the action of a flame where, with certain compositions and under certain working conditions, the evaporation of alkaline components is faster than the rate of migration from the interior of the article toward the surface. When high boron glasses (containing more than 13% $B_2O_3$) are treated in like fashion, one also obtains an evaporation of $B_2O_3$ which is equally favorable.

(c) One can also fix upon the surface of the article a thin layer of alumina which, with the supporting glass, constitutes a more durable material because it is richer in $Al_2O_3$ than the base glass.

These processes, which are efficient to some degree with homogeneous glasses, are not suitable for opal glasses belonging to the above-mentioned family of glasses since they do not obviate the chief cause for the lack of chemical durability, viz, the existence of micelles of a soluble phase close to the surface of the glass.

The treatment employed in the present invention is distinguished fundamentally from the preceding processes by the structural phenomena which come into play. Hence, it is known that phase separation will take place leading to opalescence only if the glass is maintained in a temperature zone low enough so that its state of homogeneity is unstable but high enough so that ionic mobility permits the separation of phases. A dwell period in the temperature zone required for phase separation of a certain length, depending upon the thickness of the article, is necessary to secure the desired opalescence. However, the present invention enables the development of a surface skin which exhibits little or no phase separation, without detracting from the general opal aspect of the article. The existence of this skin assures good chemical resistance. Glass forming processes in current commercial use permit the formation of such a skin, more or less accidentally, in certain areas of the surface only which detracts from the homogeneity of the product and constitutes a flaw in the appearance of the product.

Figure 2:
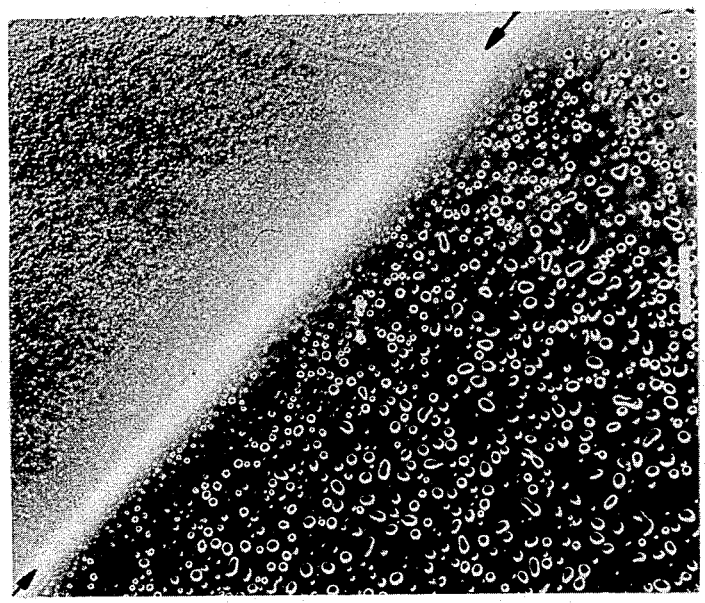

According to the present invention, a glass skin, with little or no phase separation, is produced through the rapid chilling of the glass article and holding it in the cooled condition for some time during and after forming, or by a superficial reheating to a limited depth within the surface of the article after forming, followed by rapid chilling of the surface. In general, the process comprises freezing in at low temperatures a state of phase separation which was begun at high temperatures and which would, under the normal conditions of treatment, evolve toward a state of phase separation wherein the particles are of a dimension which is incompatible with good chemical durability. The characteristics mentioned above and the advantages which result therefrom will appear in more detailed fashion in the following description of methods for securing these characteristics, this description being given as illustrative and not limitative, and in the appended drawings wherein:

FIG. 1 is a replica electron micrograph of a section of an article close to the surface thereof which had been formed in the conventional manner, the arrows delineating the surface edge; and FIG. 2 is a replica electron micrograph of a section of an article close to the surface thereof which had been formed in accordance with the present invention, the arrows again delineating the surface edge.

The treatment process of the present invention can generally be applied to all phase separating glasses, the only limitation being that each family of glasses has definite predetermined temperatures and programs of cooling. A particular example of the application of the inventive procedure can be seen in the regulation of the phase separation of a borosilicate opal glass having the composition, by weight, of 75% $SiO_2$, 13% $B_2O_3$, 9% ZnO, and 3% $Na_2O$ with a view toward reducing or suppressing this phenomenon in the surface only, while leaving unchanged the phase separation in the interior of the glass such that a strong opalescent appearance remains.

An examination of FIG. 1, viz, the replica electron micrograph illustrating the glass structure obtained through conventional forming methods, demonstrates that the readily-soluble micelles have an elongated or three-dimensional form, the linear dimensions of which can vary from about ⅛–1 micron. However, the dimensions of these micelles are more-or-less constant regardless of their distance from the surface of the article. This elongated shape of the micelles leads to ready intercommunication thereof near the surface of the article, thereby constituting a zone for preferential attack by chemical agents.

On the other hand, an examination of FIG. 2, viz, the replica electron micrograph depicting the glass structure secured through the present invention, illustrates a very great difference in the size and configuration of the micelles, especially those found within a distance of about 1 micron from the surface. Thus, these micelles of readily-soluble material are spherical and very small in size, usually less than 0.06 micron in diameter. This result can be secured in two ways: (1) by causing the partial redissolution of micelles of vitreous phase, through thermal treatments to be described hereinafter, which leads to a decrease in the size of the micelles; or (2) by preventing an increase in size of the micelles within the surface layer. Both of these methods produce a thin layer of uniform thickness on the surface of the glass having a lower opacity but which in no way detracts from the general opaque aspect. Hence, the same result can be achieved in two different ways depending upon whether the thermal treatment is applied during or after the forming operation.

In efforts to inhibit the growth of the micelles in the surface layer of the article, all portions of the forming tool normally cooled, e.g., the plunger coacting with the mold into which a gob of glass is pressed, will be maintained in intimate contact with the surface of the article for about the same period of time as is usual for the lower part of the mold, i.e., about 5 seconds, so that the surface of the article will be chilled rapidly and will not be reheated after removal from the mold under the effect of heat still stored in the underlying glass. In one variation of this practice, as soon as the plunger has been removed, the surface glass can be cooled vigorously either by blowing a cold fluid, e.g., air, thereacross or by bringing a cooled solid member such as a water sleeve into contact or in close proximity thereto. The means employed for cooling should have a cooling power at least five times as great as that which is customarily used to control the form of an article and to permit its removal from the mold.

In another variation of this operation, after forming the article and causing phase separation, a partial redissolution in the glass surface can be secured by reheating the surface of the article either immediately after forming or after complete cooling or even after a subsequent thermal treatment intended to produce opalization when such may be necessary. In this process, a surface layer is reheated above the miscibility temperature of the two phases. This surface skin is then cooled rapidly under the influence of convection and radiation to the ambient atmosphere (normally air) and conduction to the underlying glass which is much colder. Under these conditions the surface phase separation is normally not produced or, if produced at all, the micelles therein are much smaller (at least by a factor or 5) than those which exist in the surface under the usual glass forming conditions or those which exist in the interior portion of the article in order to insure an opalescent appearance. Even if the opalization treatment is undertaken after this surface reheating, the small micelles in the surface skin never grow to the point of attaining the dimensions of the micelles in the body of the glass, thereby insuring a better durability than is attained in the usual treatment.

Three modes of carrying out this surface reheating involve sweeping a burner flame over the surface of the article or placing the article for several seconds in a very hot furnace (around 1800° C.) or placing the article for several seconds, e.g., 2–10 seconds, in a bath of molten salt or metal operating at about 1000° C. Articles obtained and treated in the above manner present a surface which is significantly improved by sweeping the flame from an oxyhydrogen burner across the surfaces thereof at the rate of about 2 cm./second. The improvement secured permits the surface of the article to resist attack by washing detergents at least 10 times longer under test conditions simulating dish washing.

The rate of attack on the surface of an article molded from a phase separated glass depends upon the size and geometry of the individual micelles which are particularly subject to chemical solution. The improvement in the resistance to chemical attack involves securing a surface having individual micelles which are extremely small and spherical in shape and to having this type of micelle to as great a depth as is possible. Through the processes described above, the size of the micelles can be reduced by more than a factor of 5, as will be observed in the succeeding examples. Tables I, II, and III illustrate the improvements in chemical durability which are dependent upon the size of the micelles as a function of the distance into the article from the surface. These tables also record results illustrating resistance to detergent attack. Specimens of glass were immersed at 100° C. into a commercial detergent Mach 1, produced by Societe Diversey, which had been diluted to 1 gram/liter.

Table I sets out the size distribution of the phase separated micelles in the conventional opal glass of the above composition at two depths from the glass surface, viz, at a depth of less than 0.15 micron from the surface and at depths greater than 0.15 micron. Electron micrographs of a cross section of the glass showed that only in a very thin skin layer, i.e., less than 0.15 micron, were the micelles very small. At greater depths the micelles became large and assumed the elongated shapes depicted in FIG. 1. It is believed that the growth of the micelles is due to the coalescence of adjacent particles. As was explained above, the shape of these large micelles promotes the rapid progress of the chemical attack toward the interior of the glass. The article exhibited substantial staining after a four hour immersion in the detergent solution as indicated in the following laboratory test. This test comprises removing the glass article from the detergent solution at two hour intervals, drying, coating with red Dy-Chek™ dye, a commercially available penetrating organic liquid, allowing to stand for five minutes to permit the dye to penetrate, and removing the dye coating with a dry cloth. The presence of a red color remaining after wiping with the dry cloth indicates substantial previous chemical attack of the glass surface.

Table II reports size distributions of the phase separated micelles at various depths in the opal glass of the above composition which had been subjected to the flame treatment described above. Electron micrographs of the glass in cross section demonstrated that the so-treated article contained micelles smaller than 0.04 micron to a depth of 0.7 micron from the surface. The particles then increased in size as a function of depth. Although the micelles reach about the same relative size at a depth of about two microns from the surface as in the untreated glass of Table I, they still demonstrate a spherical rather than an elongated configuration. Substantial staining with the Dy-Chek ™ solution was observed after 40 hours in the detergent mixture, a ten-fold improvement over the untreated glass.

Table III recounts size distribution of the phase separated micelles at two depths in an opal glass article of the above composition which, during the forming step, had been allowed to remain in the mold in contact with the plunger for several seconds, in accordance with the practice described above. Electron micrographs of a cross section of the article indicated a structure intermediate that found in the examples of Tables I and II. Thus, extremely small micelles were distinguished together with particles of somewhat greater size but there were no large particles. This structure prevailed at rather great depths. For example, even at a depth of 625 microns, there were still very few large particles. The resistance to attack by the detergent is less marked than that exhibited by the glass of Table II since substantial staining was evident in the dye test after 12 hours immersion but, on the other hand, the attack proceeds very slowly to deeper depths in the article. Thus, when the examples were tested after 50 hours immersion in the detergent solution, the attack shown by the specimens of Table II was more pronounced than that demonstrated by the specimens of Table III, whereas the specimens of Table II were essentially free from detergent attack after 12 hours immersion therein.

TABLE I

| Size distribution of the phase separated micelles | | | | | Depth from surface, microns |
|---|---|---|---|---|---|
| ≤0.04 micron | 0.04-0.10 micron | 0.10-0.15 micron | 0.15-0.30 micron | >0.30 micron | |
| 100% | | | | | <0.15 |
| | 37% | 41% | 15% | 7% | >0.70 |

TABLE II

| Size distribution of the phase separated micelles | | | | | Depth from surface, microns |
|---|---|---|---|---|---|
| ≤0.04 micron | 0.04-0.10 micron | 0.10-0.15 micron | 0.15-0.30 micron | >0.30 micron | |
| 100% | | | | | <0.70 |
| 70% | 30% | | | | 0.70-1.5 |
| 19% | 61% | 20% | | | 1.5-2 |
| | 37% | 41% | 15% | 7% | >2 |

TABLE III

| Size distribution of the phase separated micelles | | | | | Depth from surface, microns |
|---|---|---|---|---|---|
| ≤0.04 micron | 0.04-0.10 micron | 0.10-0.15 micron | 0.15-0.30 micron | >0.30 micron | |
| 44% | 49% | 7% | | | ≤2.5 |
| 30% | 34% | 22% | 13% | 1% | ≤625 |

I claim:

1. A spontaneous opal glass article containing micelles of a readily-soluble, vitreous immiscible phase dispersed within a chemically resistant body glass consisting of a thin integral surface layer and an interior portion, the micelles in said surface layer exhibiting a spherical shape and being at least five times smaller in size than those micelles in said interior portion which additionally exhibit an elongated shape.

2. A process for improving the chemical durability of a pressed spontaneous opal glass article having micelles of a readily-soluble, vitreous immiscible phase dispersed within a chemically resistant body glass, said micelles being developed during the cooling of the fused glass accompanying the forming step, which comprises maintaining the plunger in intimate contact with the surface of the formed article for about the same period of time that the article is held in the mold, thereby rapidly chilling the surface of the article and preventing the reheating thereof after removal from the mold to provide a thin integral surface layer on said article wherein the micelles of said immiscible phase exhibit a spherical shape and are at least five times smaller in size than those micelles in the interior of the article which additionally exhibit an elongated shape.

3. A process according to claim 2 wherein, immediately after the plunger is removed, the surface of the article is cooled by blowing a cold fluid thereacross.

4. A process according to claim 2 wherein, immediately after the plunger is removed, the surface of the article is cooled by bringing a cold solid member into contact therewith.

5. A process according to claim 2 wherein, after forming the article and developing the opal phase therein, a surface layer within the article is heated above the miscibility temperature of the opal phase and thereafter cooled rapidly under the influence of convection and radiation to the ambient atmosphere and conduction to the underlying glass.

6. A process according to claim 2 wherein, after forming the article and developing the opal phase therein, the flame from a burner developing a temperature of about 1800° C. is moved over the surface of the article.

7. A process according to claim 2 wherein, after forming the article and developing the opal phase therein, the article is placed for several seconds in a furnace operating at about 1800° C.

8. A process according to claim 2 wherein, after forming the article and developing the opal phase therein, the article is immersed for several seconds into a bath of molten salt or molten metal operating at about 1000° C.

References Cited

UNITED STATES PATENTS

| 2,339,975 | 1/1944 | Blau | 65—33 X |
| 3,574,045 | 4/1971 | Mould | 65—114 X |
| 3,531,272 | 9/1970 | Menear | 65—33 |
| 3,451,797 | 6/1969 | Meth | 65—116 |

FOREIGN PATENTS

| 10,786 | 1884 | Great Britain. |

ARTHUR D. KELLOGG, Primary Examiner

U.S. Cl. X.R.

65—33, 114

UNITED STATES PATENT OFFICE
CERTIFICATE OF CORRECTION

Patent No. 3,741,861           Dated June 26, 1973

Inventor(s) Andre Andrieu

It is certified that error appears in the above-identified patent and that said Letters Patent are hereby corrected as shown below:

Column 1, line 5, insert -- assignor to Corning Glass Works, Corning, New York. --.

Signed and sealed this 15th day of January 1974.

(SEAL)
Attest:

EDWARD M. FLETCHER, JR.　　　　　RENE D. TEGTMEYER
Attesting Officer　　　　　　　　Acting Commissioner of Patents